May 29, 1928.  
D. L. MORRIS  
LOCKING DEVICE  
Filed March 25, 1926   2 Sheets-Sheet 1
1,671,602
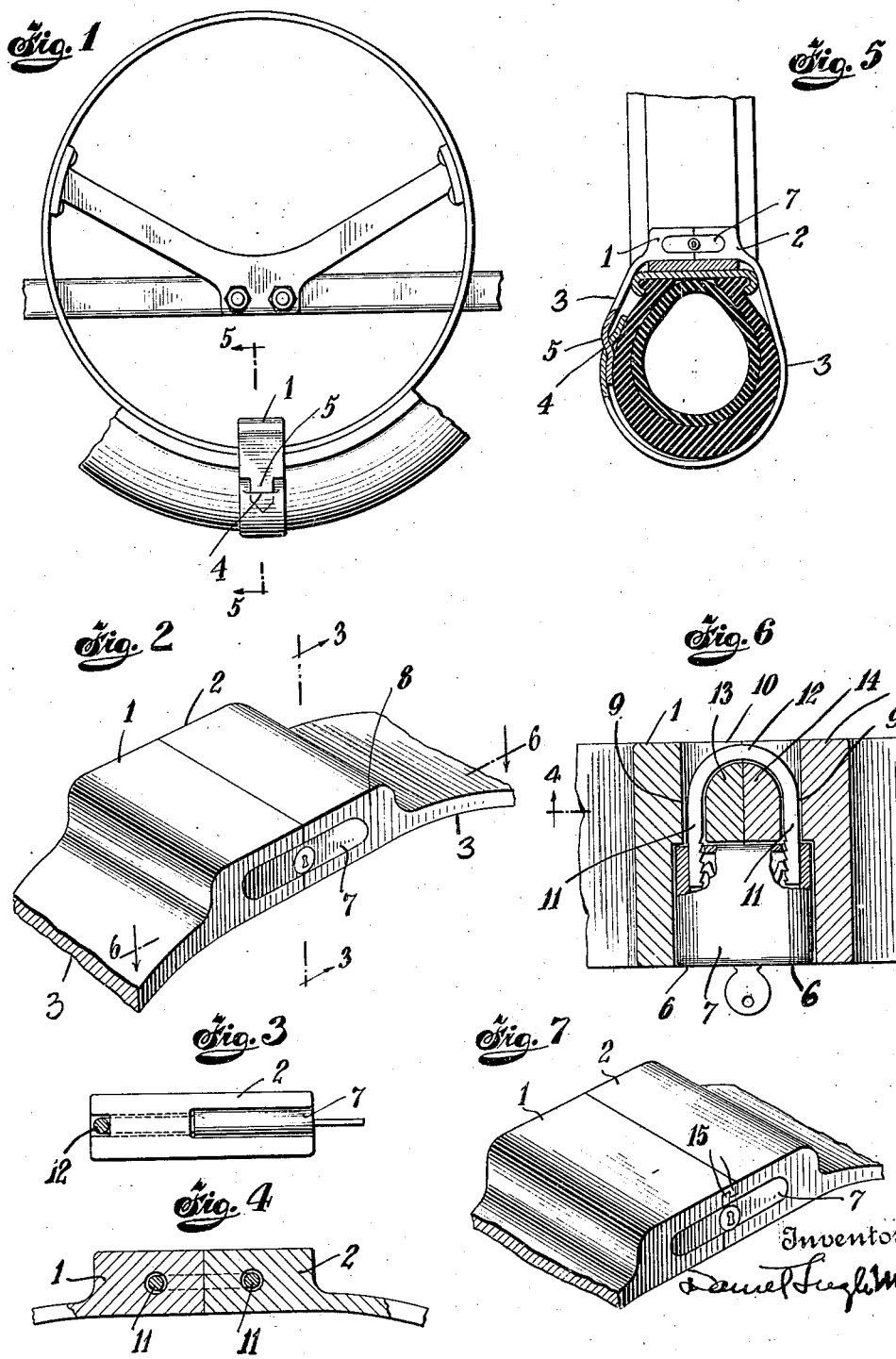

May 29, 1923.
D. L. MORRIS
LOCKING DEVICE
Filed March 25, 1926     2 Sheets-Sheet 2
1,671,602
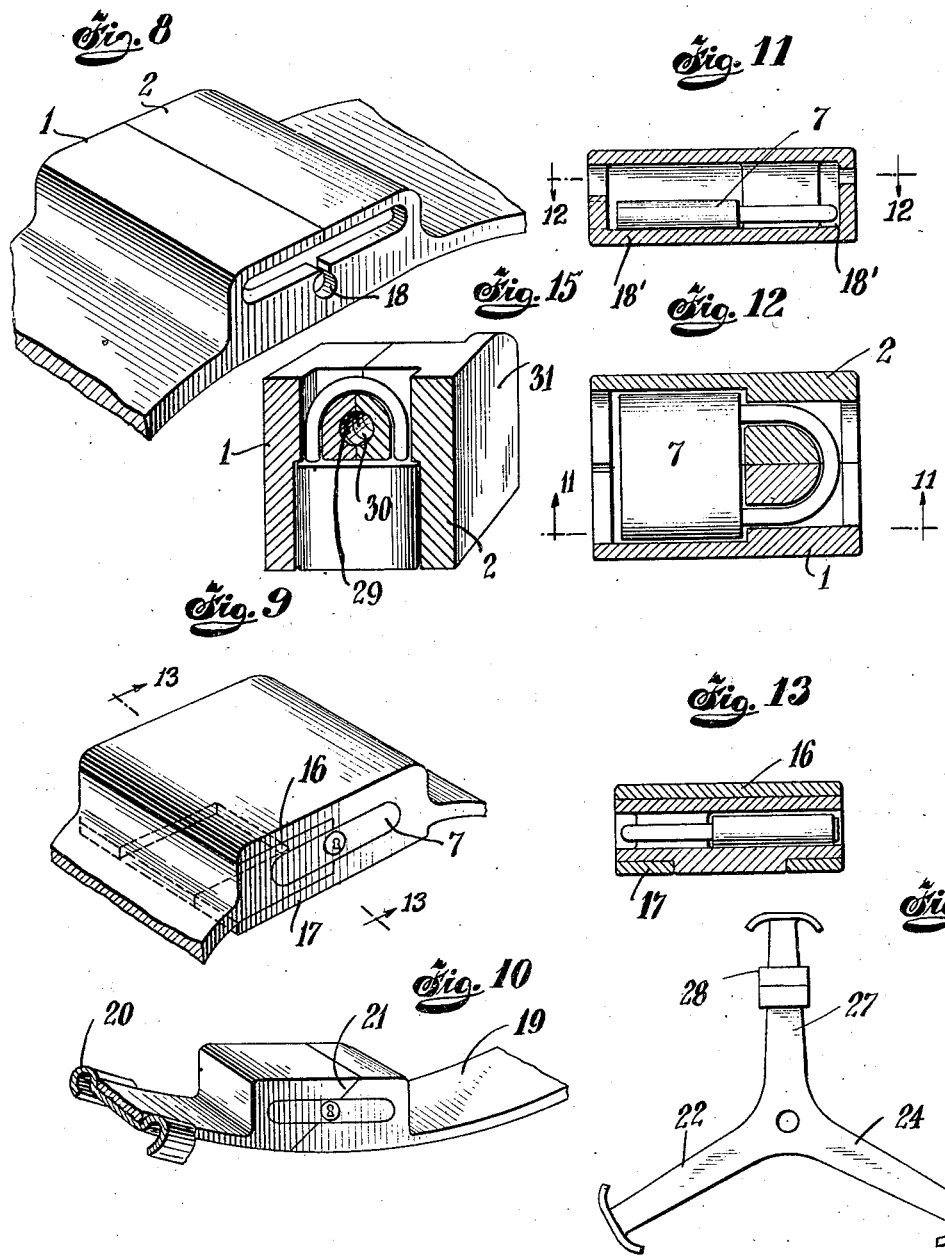
Inventor
Daniel Leigh Morris.

Patented May 29, 1928.

1,671,602

UNITED STATES PATENT OFFICE.

DANIEL LEIGH MORRIS, OF NEW YORK, N. Y.

LOCKING DEVICE.

Application filed March 25, 1926. Serial No. 97,405.

This invention relates to a locking device.

In the past it has been the practice to secure relatively movable parts together by means of a padlock which in its locking position has been so exposed as to permit access to the entire lock with the result that the breaking or cutting of the lock has been accomplished with considerable ease. This disadvantage has been somewhat overcome by building into one of the relatively movable parts a lock which, however, becomes a permanent and component portion of the part with which it is associated. This, too, has its disadvantages. For instance, should the lock mechanism become inoperative or ineffective, the entire device with which it is used is rendered useless.

The present invention contemplates the securing together of relatively movable parts by means of a lock which is independent of the parts themselves and which is so housed that access to it for the purpose of cutting or breaking cannot be had.

In the drawings:

Figure 1 is a view of one type of extra tire carrier showing a portion of the tire and rim and one form of the invention;

Figure 2 is a fragmentary perspective view of the form of the invention shown in Figure 1;

Figure 3 is a section on line 3—3 of Figure 2;

Figure 4 is a section on line 4—4 of Figure 6;

Figure 5 is a section on line 5—5 of Figure 1;

Figure 6 is a section on line 6—6 of Figure 2;

Figure 7 is a fragmentary perspective view of a modified form;

Figure 8 is a fragmentary perspective view of another modified form;

Figure 9 is a similar view of another modified form;

Figure 10 is a similar view of another modified form;

Figure 11 is a section on line 11—11 of Figure 12;

Figure 12 is a section on line 12—12 of Figure 11;

Figure 13 is a section on line 13—13 of Figure 9;

Figure 14 is a view of another modified form; and

Figure 15 is a section of another modified form.

I have chosen to illustrate my invention as a locking device for securing an automobile tire to its carrier but this choice, it is to be understood, is only for the purpose of illustration as the application of the invention is of much wider range.

The embodiment illustrated in Figure 1 of the drawings includes a housing composed of separable elements 1 and 2, each of which is, in this instance, carried by a tire embracing element, 3, which together form a tire encircling member, and which may be of any desired form that will permit the separation of the elements of the housing. I have illustrated this tire encircling member as of rigid metal having ends interlocked in any suitable manner, such as a slot and tongue connection 4—5. It may, however, be replaced by any other well known hinge connection.

Each of the housing elements 1 and 2 is provided with a recess 6. These recesses are adapted to register with each other when the elements 1 and 2 are in proximity to each other to form a chamber for the reception of the body of a padlock. This chamber opens through one face 8 of the housing to permit the insertion of the body of the padlock into the receiving chamber.

Extending from each of the recesses 6 is a channel 9, which channels open through the face of the housing opposite to that through which the chamber opens. These channels 9 are connected by a cross channel 10. The channels 9 are adapted to receive the legs 11 of the shackle of the padlock and the channel 10 to receive the bight 12 of the shackle. The depth of the channel 10 is sufficient to permit the partial or complete housing of the bail of the lock.

In the illustrated form of the padlock, the shackle is completely separable from the body.

The provision of the channels 9 result in the production of abutments 13 and 14 on the elements 1 and 2, which lie between the legs 11 of the padlock shackle.

With this arrangement the body of the lock may be inserted in the chamber 6 through the opening in the face 8, and the shackle may be inserted through the opening in the opposite face so that the legs 11 will project through the channels 9 and engage the locking mechanism in the body of the lock, and so that the bight portion 12 will lie in the cross channel 10. The body of the lock and the shackle will secure each other within the housing and the legs of the shackle will secure the abutments 14 together thus securing the two elements of the housing together.

The recesses in which the padlock body and shackle are located are preferably large enough to insure slight looseness of the lock, but small enough to prevent the insertion of a tool between the lock and the adjacent wall of the housing.

Should the bight portion 12 of the shackle be cut a portion of the curved bight will remain and the legs 11 will remain secured to the body of the lock and still effectively prevent the separation of the elements of the housing. In fact the presence of the bight portion of the shackle is not essential. It is only essential that the legs of the shackle be so formed or associated with channels so formed that the shackle cannot be withdrawn with the body of the lock in a direction opposite to that in which the body of the lock is inserted in the receiving chamber. This makes it possible to use two separate legs without the connecting bight.

Thus it will be seen that the lock is entirely separate from the housing so that should an attempt be made by an unauthorized person to remove the lock and the lock injured in the attempt, it may be removed by an authorized person and replaced by another at little expense, since the housing will remain intact. Therefore, the lock being separate from the housing, the latter need not be replaced upon the replacing of the lock.

In order to prevent the possibility of any lateral shearing strain being imposed on the legs of the shackle by, for instance, the insertion of a tool between the meeting faces of the elements of the housing, I contemplate (see Figure 7) the use of an interlocking tongue and groove connection 15 between the elements.

This may be carried a step further (see Figure 9) by having upper and lower flanges 16 and 17 project from one of the elements of the housing and overlap the other element. This arrangement will obviate the possibility of any force being exerted on the bail of the lock by a tool inserted between the meeting faces of the elements of the housing.

In the type of locking device which I have just described, the plane of the face through which the lock body is inserted is preferably substantially transverse to the plane of the tire (see Figures 1 and 5), so that the curvature of the rim makes the exposed portions of the bail and lock body even less accessible to the insertion of a tool or the delivering of a blow to the tool.

In the hereinbefore described construction, it is possible to injure the lock although not to a point to render it ineffective to hold the two parts of the housing together, by delivering blows against the bight of the shackle or against the exposed end of the lock body. However, this may be rendered impossible by increasing the depth of the lock body receiving chamber and of the channels 9 and 10 to permit the lock to assume a position such as shown in Figures 8, 11 and 12. In this form, the openings through which the shackle and body of the lock are inserted into the housing are of the same size as in the other form, but the face of the housing in which the opening 6 is located is provided with an opening 18 connecting with the opening 6 and the receiving chambers for the body of the lock and for the shackle are deepened as at 18'.

The key hole of the lock is adapted to come to rest in alignment with the opening 18 so that when it is desired to remove the lock the key may be inserted and the lock raised until the shackle and lock body align with their respective entry openings at which time they may be separated and removed through such openings.

The value of this disappearing feature lies in the fact that before any part of the lock can be reached with an implement of destruction the lock must be aligned with the openings in the housing and held in that position, the holding of which will militate against the delivery of a destructive blow to the lock.

In the form of the invention shown in Figure 10, I have shown it adapted to that type of tire carrier which includes an expansible band 19 which is adapted to be expanded within the tire rim and between the flanges 20. The housing in this form consists of the elements 1 and 2 which have coacting cam faces 21 which are adapted to expand the band to its locking position. The padlock here not only secures the elements of the housing together, but prevents the reaction of the cam faces.

The tire carrier shown in Figure 14 includes a plurality of legs 22, 23, and 24, which have ends adapted to engage the rim in much the same manner as the band of Figure 10. The securing action is attained by a telescopic or jointed section 28 in one of the legs 27 for instance. In this form one of the housing elements is carried by the leg 27 and the other by the section 28. The lock secures the two together and the rim and tire on the carrier.

When extra disc wheels are carried they are usually secured in place by bolts and nuts, so that if the nuts or any of them are secured on the bolts the removal of the wheel will be prevented. In Figure 15 I have shown the invention adapted for this use. In this form the two elements 1 and 2 of the housing are provided with complemental threaded recesses 29 and 30, which together form a threaded hole for the reception of the threaded bolt. A flange 31 is provided to engage the wheel to prevent the turning of the housing.

In this form of the invention, the elements 1 and 2 are held together by the body and shackle of the lock. In this type of carrier, the wheel is oft times held upon a metal spindle or by the insertion of a padlock through an opening in one of the lugs, rather than by threaded nuts. This form of the invention may be adapted for such a carrier by simply omitting the threads within the openings 29 and 30 and extending from one of both of the elements 1 or 2 a lug which will project through the opening in the spindle or in the bolt. In this event, the flange 31 may be dispensed with because the rotation of the device on the spindle or on the bolt will be prevented.

What I claim is:

1. In a locking device, a housing consisting of separable elements and a padlock mounted removably therein and adapted to secure said separable elements together.

2. In a locking device, a housing consisting of separable elements and a padlock independent of the housing mounted removably therein and adapted to secure said separable elements together.

3. In a locking device, the combination with a pair of abutments of a lock independent of said abutments, adapted to secure the same together, and a housing for said lock.

4. A lock housing having abutments located therein, and having channels leading to said abutments and a chamber communicating with said channels.

5. In a locking device a pair of housing elements adapted to form a substantially complete housing and a lock located within the housing and removable therefrom and adapted to secure the elements together.

6. In a locking device the combination with a multi-part housing of a padlock removably mounted in said housing, each of said parts having an abutment adapted to be engaged by the shackle of the lock to hold the elements together.

7. In a locking device a housing consisting of separate parts and having openings for receiving the body and shackle of a padlock, abutments located within said housing and adapted to be engaged by the shackle of the lock to prevent the separation of the parts of the housing.

8. In a locking device, a housing consisting of separate recessed parts, abutments located within said recessed parts, and a removable lock adapted to secure said abutments together and located within said housing.

9. In a locking device the combination with a two-part housing, each of said parts having a recess therein, said recesses forming a receiving chamber for the body of a padlock, and each of said parts having a channel, said channels being adapted to cooperate to receive the shackle of the padlock, and each of said parts having an abutment adapted to lie within the shackle of the lock, and a lock mounted therein.

10. In a locking device, a pair of housing elements, and a shackle securing said elements together, said elements having channels for the reception of the legs of the shackle and channels for the reception of the bight of the shackle whereby the shackle is substantially concealed by said elements.

In testimony whereof, I have signed my name to this specification.

DANIEL LEIGH MORRIS.